United States Patent [19]
Magorian

[11] 3,956,749
[45] May 11, 1976

[54] BEARING MEASUREMENT DEVICE FOR A PORTABLE ATTACK WARNING RADAR

[75] Inventor: William Ray Magorian, China Lake, Calif.

[73] Assignee: The United States of America as represented by the Secretary of the Navy, Washington, D.C.

[22] Filed: Apr. 16, 1973

[21] Appl. No.: 351,727

[52] U.S. Cl. .......................... 343/16 R; 343/100 CL
[51] Int. Cl.² .......................................... G01S 9/52
[58] Field of Search ......... 343/16 R, 16 LS, 100 CL

[56] References Cited
UNITED STATES PATENTS

| | | | |
|---|---|---|---|
| 2,929,056 | 3/1960 | Page | 343/16 R X |
| 2,965,898 | 12/1960 | Lewis | 343/16 R X |
| 3,300,768 | 1/1967 | Bystrom et al. | 343/5 PD X |
| 3,689,750 | 9/1972 | Esser | 343/100 CL X |

*Primary Examiner*—Malcolm F. Hubler
*Attorney, Agent, or Firm*—R. S. Sciascia; Roy Miller

[57] ABSTRACT

An attack warning system for alerting ground troops or ships to the possibility of attack by enemy aircraft. The system establishes a detection shell at a range of 3 miles covering 360° in azimuth and 60° in elevation. The bearing measurement is obtained by a combination of antenna pattern shape and P-N Code modulation. A pair of oppositely facing receiving antennas and a pair of oppositely facing transmitting antennas located orthogonally with respect to the receiving antennas provide the 360° coverage. The azimuth pattern of each antenna covers 180°. The system provides target bearing information by applying different codes to each of the two opposed transmit antennas and multiply decoding the received signals.

1 Claim, 2 Drawing Figures

BEARING MEASUREMENT DEVICE FOR A PORTABLE ATTACK WARNING RADAR

BACKGROUND OF THE INVENTION

1. Field of the Invention

This invention pertains to bearing measurements devices for psuedorandom noise radar systems.

2. Description of the Prior Art

Ordinary antenna systems require drive motors to enable the systems to cover 360°. The present invention obtains range tracking and angle measurement information in a manner such that no mechanical motion of the antenna will be necessary, thus eliminating the need for antenna drive motors and, also, eliminating clutter modulation by a scanning antenna pattern. The latter feature provides for maximum sub-clutter visibility through velocity discrimination. Velocity measurement will be accomplished by bandpass filtering the doppler spectrum in a number of contiguous channels.

SUMMARY OF THE INVENTION

The invention includes a pair of oppositely facing receiving antennas and a pair of oppositely facing transmitting antennas. The pairs of antennas are located orthogonally with respect to each other. A phase modulated constant wave source is fed into each of the two transmit antennas with a different P-N Code to each transmit antenna. The receiving antenna signals are homodyned by the unmodulated constant wave source. The resulting coded video is amplified and compared in two correlators, one having a delayed version of the code transmitted by one of the transmitting antennas and the other correlator having a delayed version of the code transmitted by the other transmitting antenna.

DESCRIPTION OF THE PREFERRED EMBODIMENT

Figure 2:
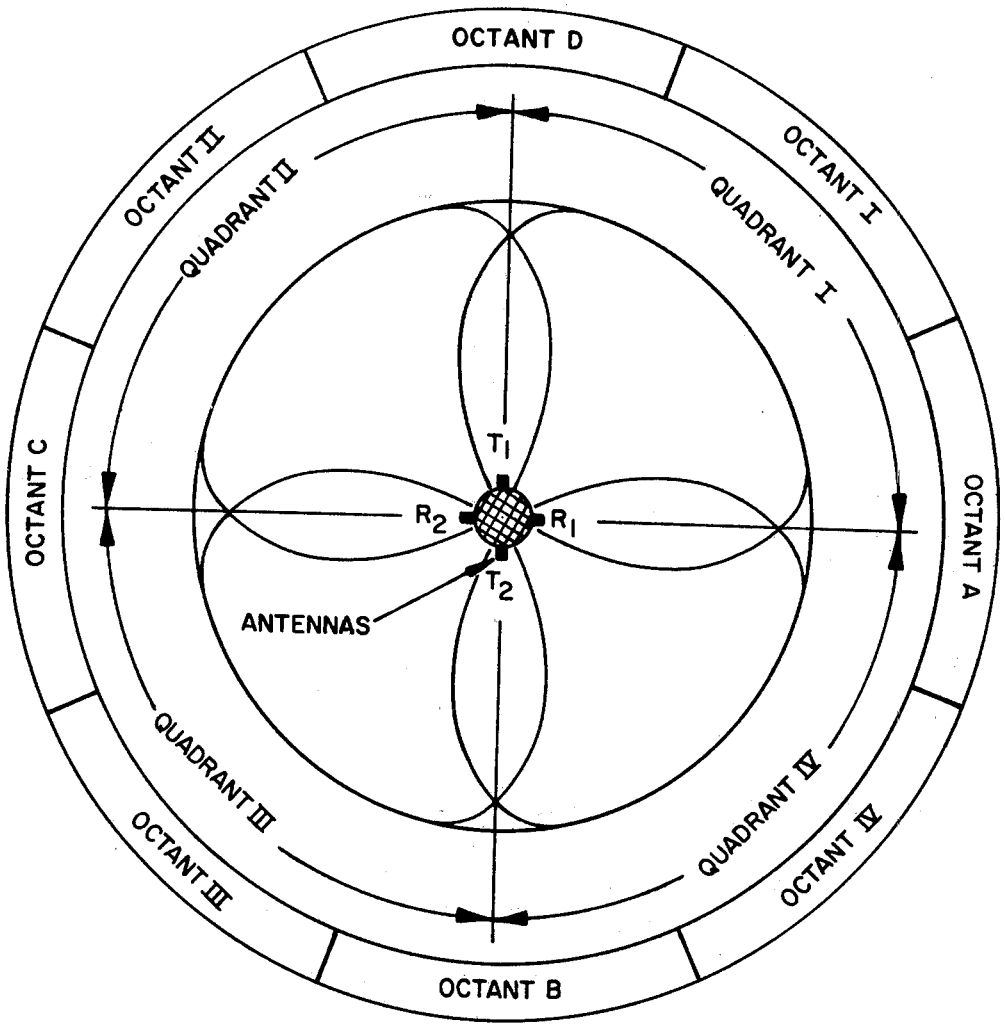
FIG. 2 is a schematic view of the four identical antennas and the range which they each cover.

Bearing measurement in this system is obtained by a combination of antenna pattern shape and P-N code modulation. In FIG. 2 is shown the antenna coverage required by the radar showing 360° coverage. The implementation of this pattern is a composite of the pattern of four identical antennas mounted as shown in FIG. 2. The azimuthal pattern of each antenna covers 180° and thus the patterns of adjacent antennas overlap in a full quadrant. By alternating the function of the antennas (transmit-receive) as shown in FIG. 2, a target present in quadrant I would be received in antenna $R_1$ from illumination by energy transmitted from antenna $T_1$. If the signal received in $R_1$ had been the result of energy transmitted from antenna $T_2$ the target would have had to be located in quadrant IV. Greater angle resolution can be obtained by comparing the amplitude of return in adjacent quadrants. For example octant resolution is obtained from the logic that a signal seen in both quadrants I and IV must be the result of a target present at an angle between the defined quadrant angles (i.e. segment A). This octant logic resolution is the result of a simple decision as to whether or not a target signal exists in a given quadrant. Resolution to within 2° may be obtained using the difference in amplitude present in adjacent quadrants, a common direction-finding technique. The antenna also has a coverage from the horizon to an elevation angle of 60°.

Figure 1:
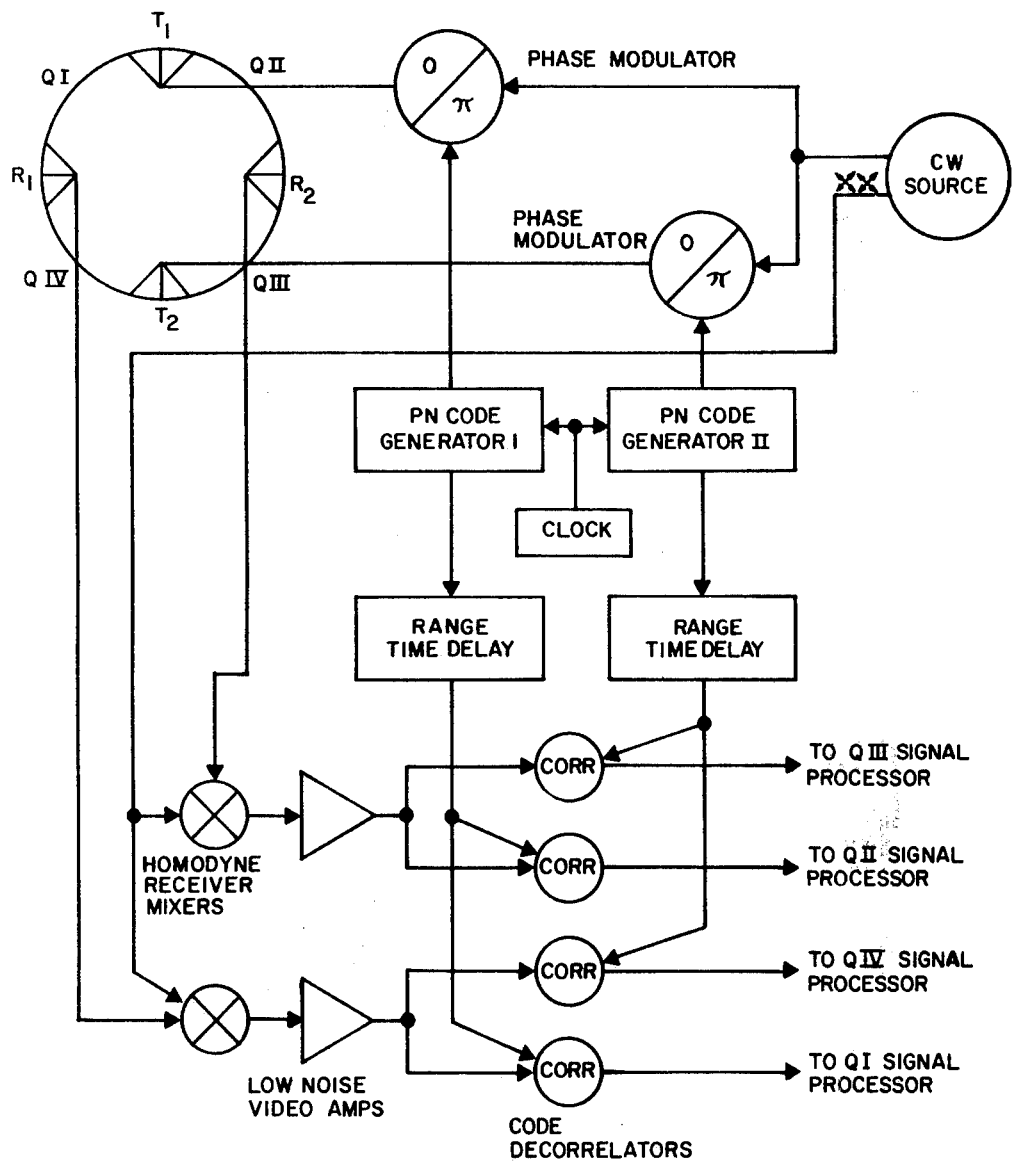
FIG. 1 is a block diagram of the system.

Shown in FIG. 1 is a constant wave oscillator which provides both the transmit and receive local oscillator signal. A separate binary phase modulator associated with each transmit antenna imparts a different pseudo-noise code to the radiation of transmit antenna $T_1$ than to transmit antenna $T_2$. The receive antenna signals are homodyned by the unmodulated constant wave source. The resulting coded video is amplified by wide band, low noise, video amplifiers. Each receiver video is then compared in two decorrelators, one decorrelator having a delayed version of the code transmitted by antenna $T_1$ and the other decorrelator having the delayed version of the code transmitted by antenna $T_2$. Since the two codes are either completely orthogonal or at least orthogonal over the range of interest the quadrant I correlator will produce an output only when the signal received from antenna $R_1$ has the "P-N Code I" encoded on it. This identifies the signal as having been transmitted from transmit antenna $T_1$. The decorrelator of quadrant IV will produce a signal, again received from antenna $R_2$, only when the received signal is encoded with the code transmitted from antenna $T_2$.

What is claimed is:

1. A bearing measurement device for a pseudo-random noise radar system comprising:
   at least first and second oppositely facing receiving antennas;
   at least first and second oppositely facing transmitting antennas;
   said transmitting antennas being located orthogonally with respect to said receiving antennas;
   a constant wave source supplying first and second output signals;
   first phase modulator having first and second inputs and an output and second phase modulator having first and second inputs and an output;
   said first output signal of said constant wave source being coupled to said first input of said first phase modulator and said first input of said second phase modulator, said output of said first phase modulator supplying signals to at least said first transmitting antenna, said output of said second phase modulator supplying signals to at least said second transmitting antenna;
   a first homodyne receiver mixer coupled to receive signals from said first receiving antenna and a second homodyne receiver mixer coupled to receive signals from said second receiving antenna, each of said first and second homodyne receiver mixers additionally coupled to receive a reference signal from said second output of said constant wave source so that each mixer supplies an output of coded video signals;
   first PN code generator having first and second outputs and a second PN code generator having first and second outputs, said first output of said first PN code generator electrically coupled for supplying coded signals to said second input of said first phase modulator and said first output of said second PN code generator electrically coupled for supplying coded signals to said second input of said second phase modulator;
   first range time delay network having an input coupled to receive said second output of said first PN code generator and second range time delay network having an input coupled to receive said second output of said second PN code generator, first, second, third and fourth code decorrelators; said first and third code decorrelators coupled to receive an output from said second range time delay network and said second and fourth code decorrelators coupled to receive an output from said first range time delay network;

first low noise video amplifier coupled between said first homodyne receiver mixer and said third and fourth code decorrelators for comparing the output of said first homodyne receiver mixer in said third and fourth code decorrelators for providing signal outputs to quadrant four and one signal processors, respectively; and second low noise video amplifier coupled between said second homodyne receiver mixer and said first and second code decorrelators for comparing the output of said second homodyne receiver mixer in said first and second code decorrelators for providing signal outputs to quadrant three and two signal processors, respectively.

* * * * *